3,503,218
RISER INSTALLATION METHOD
Edgar R. Broadway, Gretna, and Robert B. McLeod, Belle Chasse, La., assignors to Brown & Root, Inc., Houston, Tex., a corporation of Texas
Original application Feb. 11, 1963, Ser. No. 257,706, now Patent No. 3,258,928, dated July 5, 1966. Divided and this application Feb. 17, 1966, Ser. No. 538,882
Int. Cl. E21b 15/02; F16b 1/00
U.S. Cl. 61—72.3
17 Claims This is a division of application Ser. No. 257,706, filed Feb. 11, 1963, now Patent No. 3,258,928.

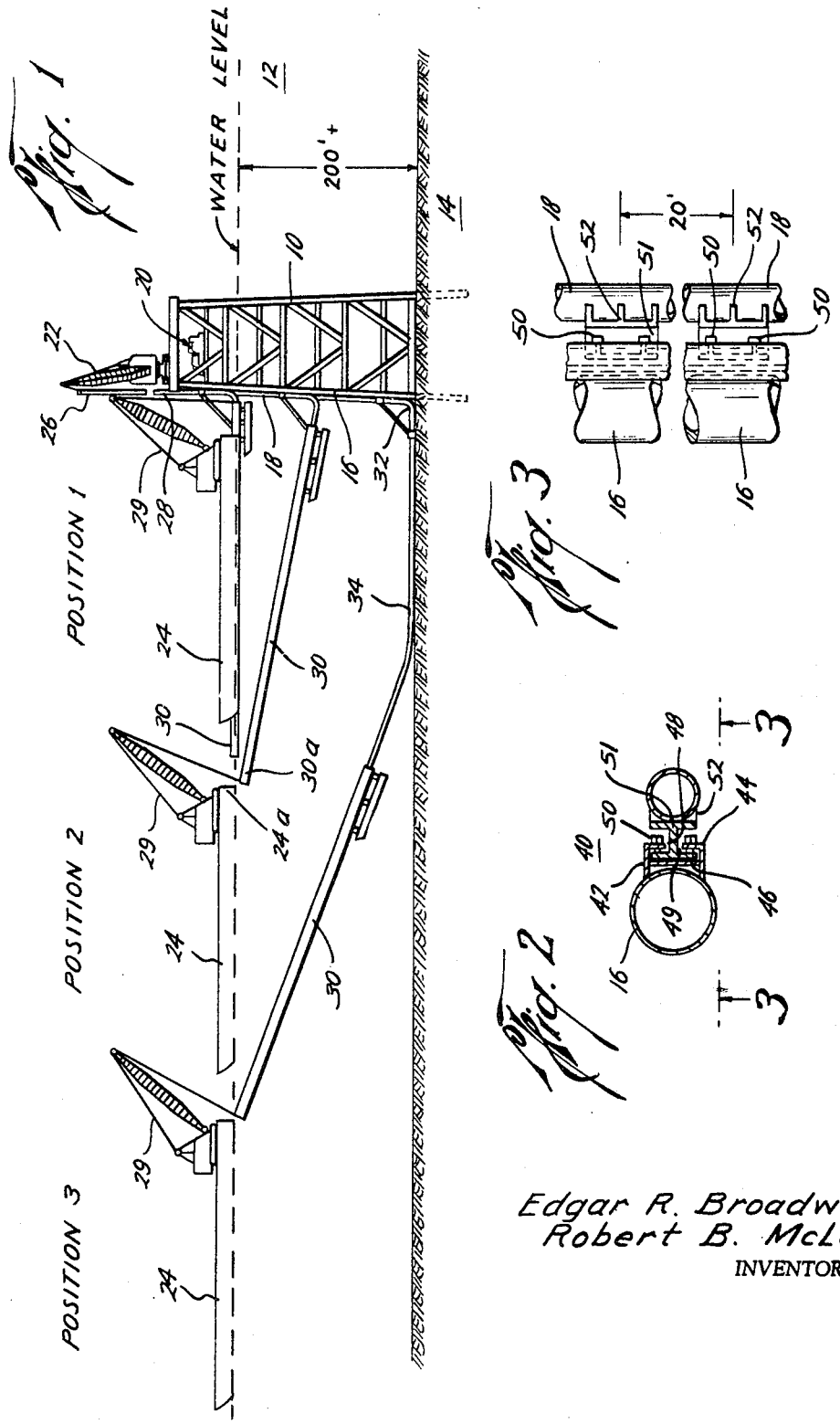
March 31, 1970 — E. R. BROADWAY ET AL — 3,503,218
RISER INSTALLATION METHOD
Original Filed Feb. 11, 1963
Edgar R. Broadway
Robert B. McLeod
INVENTORS United States Patent Office 3,503,218
Patented Mar. 31, 1970

This invention pertains generally to pipe equipment and particularly to pipe equipment and methods utilized in providing riser installations on offshore structures.

During the past few years increased oil and gas exploration actively has occurred at substantial distances from shore lines in bodies of water such as the Gulf of Mexico. Such increased oil and gas exploration activity and the consequent discovery of producing oil and gas have necessitated many improvements in bringing the produced oil and gas to shore in an economical, safe, and practical manner. One of the most desirable methods of transporting gas and oil produced from offshore wells is through pipeline systems which are connected to the wellhead and to suitable facilities on shore.

A satisfactory arrangement for coupling a pipeline to a producing well has been found to be through a riser pipe or vertical tubular structure coupled to a pipeline which is laid on the bed of the body of water and to related apparatus at the platform structure adjacent the wellhead. The installation and coupling of riser installations from each well to the pipeline has been a cumbersome, expensive, and sometimes dangerous task in past practice. Divers have been required to install risers and as the depth of the water in which producing wells have been developed is increased, use of divers has been substantially adversely effected due to the physical limitations of the divers to work effectively in water having depths greater than 175 or 200 feet. In depths of water in the vicinity of 200 feet and deeper, a diver is incapable of staying down except for very short periods of time and therefore the number of divers required per job has raised the cost considerably of setting a riser. Extensive use of divers has been required particularly to make connection of the riser to the platform structure and to connect the main pipeline to the riser.

Thus, the present invention provides improved methods for installing a vertical tubular structure near a platform in a body of water.

Another object of the present invention is to provide improved methods for installing a riser to a pipeline laid on the bed of a body of water, such means including a rail assembly into which the riser is positioned and lowered as the riser length is increased by coupling of riser sections from the upper part of a platform structure.

Yet another object of the present invention is to provide a method of coupling and positioning a riser to a wellhead in a body of water and to a pipeline laid on the bed of such body of water without the need of numerous diving personnel.

Still another object of the present invention is to provide methods for installing risers in an economical, safe, and effective manner.

FIGURE 1 is an elevational view showing various steps in installing a riser with the aid of a pontoon and barge in accordance with the present invention;

FIGURE 2 is an elevational view of a portion of the monorail assembly utilized on the platform structure while practicing the present invention; and FIGURE 3 is a plan view of the monorail assembly shown in FIGURE 2 taken along line 3—3.

Briefly stated, the invention provides a monorail assembly coupled to a leg of a platform structure before the structure is installed in a body of water, such monorail assembly being used for positioning a riser as the riser's length is increased and lowered along the monorail assembly into the body of water in a combined operation with related apparatus. Such related apparatus may include a winch positioned on the platform and a pontoon and pipe laying barge, with the pipe laying barge having a dragline or crane assembly positioned at the stern of the barge. The main pipeline to be coupled to the riser is assembled in lengths on the barge and by means of lifting equipment on the barge the pipe is placed in the pontoon and the lower portion or elbow of the riser is welded to the pipeline. A line from the winch on the platform is run through a block attached to the lower part of the riser and tied to the upper part of the platform structure. After the riser is coupled to the pipe on the pontoon, the pipe laying barge begins to move away from the platform structure and ahead of the pontoon. The pontoon remains in its original position until the stern of the pipe laying barge has reached the bow of the pontoon. At this time the pontoon is attached through suitable means to the stern of the pipe laying barge and additional pipe sections on the pipe laying barge are coupled to the string of pipe on the pontoon. Upon completion of the coupling of the pipe, the pontoon is lowered simultaneously as the riser pipe is being stalked on from the upper portion of the platform structure. When the riser has reached its maximum length and the riser elbow is on the bottom of the body of water, the riser is secured to the platform structure by fastening means on the monorail assembly.

Referring now to the drawing in detail, FIGURE 1 is an elevational view showing various stages of installation of a tubular structure or riser while practicing the present invention. Prior to the present invention, riser clamps were used for attaching the riser to a platform. However, as the depth of the water in which the platform is positioned has become deeper, the known method of attaching risers to such platform has become a very costly endeavor because diving personnel are required to attach such clamps to the risers. At depths now encountered, a diver is not capable of staying down except for very short periods of time and while down, the efficiency of the diver at increased depths is quite limited. Therefore, the number of divers required has raised the cost of setting the riser pipe in the conventional manner to a prohibitively high figure.

In the present invention as exemplified in FIGURE 1 a platform 10 is positioned in a body of water 12 with a plurality of legs of platform 10 being disposed in the bed 14. The depth of the body of water 12 may vary but the present invention has particular adaptability to water which is 200 feet or deeper. One of the legs 16 of platform 10 may be chosen for positioning a riser 18. Platform 10 accommodates a slotted monorail assembly into which the riser is lowered as it is assembled at the top of the platform with power means such as a winch 20 and a dragline 22 being located temporarily on platform 10. The size of winch 20 and dragline 22 will vary according to the size of the riser pipe to be positioned along the platform leg.

Vessel means including a pipe laying barge such as identified as 24 in FIGURE 1 is moved into proper location and the winch 20 and dragline 22 are then placed on the platform structure 10. Dragline 22 is used to stack joints of pipe in a substantially vertical position to a previous joint of pipe. A joint 26 is shown in FIGURE 1 prior to being coupled to the main section of riser 28. The winch 20 lowers the lengthening riser pipe into the slotted rail assembly until the riser rests in its proper place at the bottom of the body of water, namely on bed 14.

FIGURE 1 shows three positions of the riser installation operation. In position 1 the barge 24 is placed at the proper location near platform 10 with a pontoon pipe support 30 floating along the pipe ramp side or working side of the barge 24. Pontoon 30 is loaded with a continuous string of pipe to which the lower portion or elbow of the riser is coupled as soon as the proper elevation is obtained during lowering of the riser. The cable or line from the winch 20 is run through a block attached to the lower part of the riser and is tied to the upper part of platform 10. Dragline 29 on barge 24 is used to support the pipe while the riser elbow is being coupled thereto. When the riser has been attached to the pipe in the pontoon, dragline 29 is uncoupled and the barge 24 is ready to be moved away from the platform 10. As barge 24 moves ahead, the pontoon 30 remains in its original position until stern 24A has reached the bow 30A of the pontoon 30. At this time pontoon 30 is attached to dragline 29 positioned on the stern 24A of the barge. Since a pipe laying barge is being used, the pipe on the barge is coupled as by welding to the string of pipe in the pontoon and upon completion of this coupling or weld, simultaneous action occurs so that the pontoon 30 is lowered along the monorail assembly on leg 16 as the riser pipe 18 is being stalked on from the upper part of platform 10. Care must be exercised as to the depth of the pontoon thereby keeping the pipe from deflecting beyond the allowed radius of curvature.

Position 3 of FIGURE 1 shows the riser bend 32 on the bed 14 of the body of water 12 as the pipeline 34 is settling on the bed 14. The barge moves ahead as each pipe joint is stalked on the pipeline 34 as in the normal pipe laying procedure utilized with a pipe laying barge and pontoon. The riser 18 then is secured to the platform 10 by fastening means on the monorail assembly shown in more detail in FIGURES 2 and 3. The monorail assembly, as shown in FIGURES 2 and 3, has a plurality of fasteners such as set screws 50 which are tightened by a diver who goes down into the water 12 to secure the monorail assembly to the platform leg.

FIGURE 2 is a plan view of the monorail assembly showing the relationship of platform leg 16 and the riser 18. Platform leg 16 has coupled thereto the monorail assembly generally identified as 40. The monorail assembly 40 includes angle members 42 and 44 coupled to a brace member 46 which extends between angle members 42 and 44 and supports them. Angle members 42 and 44 are so positioned that slot or opening 48 is provided between angle members 42 and 44. This part of the monorail assembly is located on the platform prior to the platform installation in the body of water. A chamber 49 is provided in which a suitable member such as a web flange beam 51 is positioned. Beam 51 is coupled to the riser 18 by a plurality of gusset members 52. Set screws 50 are shown positioned in angle members 42 and 44.

FIGURE 3 is an elevational view taken along the line 3—3 of FIGURE 2 showing how the monorail on the riser pipe 18 may be formed in sections with approximately 20 feet spacing being used along riser pipe 18. However, members 42, 44, and 46 which are attached to the platform leg 16 form a continuous chamber or slot 49 that extends along the full length of platform leg 16. It will be appreciated from FIGURE 3 that the monorail assembly of the present invention allows the riser pipe 18 to be slidably positioned along platform leg 16 until the bottom of the riser is on or sufficiently adjacent to bed 14 whereupon fastening means such as set screws 50 are used for rigidly securing the riser pipe 18 to leg 16.

Thus, the invention provides improved apparatus and methods for positioning and securing a riser pipe to a platform in a body of water having substantial depth. The apparatus and methods of the present invention materially decrease the cost, time, and equipment previously necessary for making riser installations under similar conditions.

Although a preferred embodiment of the invention has been shown and described, the invention is defined by the following claims. Although such claims may be presented in indented format to facilitate reading and understanding thereof, such indented format is not to be construed as a structural or functional limitation of the elements or steps recited in the claims.

What is claimed is:

1. A method of laying a tubular structure near a platform in a body of water, said method comprising the steps of
   floating a substantially horizontal section of the tubular structure on a pontoon as a vertical section of the tubular structure is disposed adjacent the platform and coupled to said horizontal section, and
   adding lengths of tubular structure to said vertical and horizontal sections as the same are lowered into the water until said horizontal section rests upon the bed of the body of water, with said vertical section being lowered along said platform.

2. A method of positioning a riser on a platform disposed in a body of water, said method comprising the steps of
   positioning a floating support alongside the platform, said support supporting a tubular structure having an elbow on the end of the tubular structure nearest the platform, and
   adding vertical sections of tubular structure at the elbow to form a riser as the floating support moves away from the platform and the vertical sections are lowered into the water along said platform.

3. A method for positioning a riser on an off-shore platform having at least one leg in a substantially vertical plane, said method comprising the steps of
   coupling a section of the riser to an elbow coupled to a horizontal section of pipe,
   lowering the elbow along the leg of the platform as additional sections are coupled to the riser from the upper part of the platform and additional sections of pipe are coupled to the horizontal section of pipe, and
   locking the fastening means on the leg of the platform after the elbow has reached the bottom of the platform thereby maintaining the riser in a substantially fixed position.

4. A method for placing a flow line on a well structure extending from above water surface to water bottom, which comprises
   arranging a first length of said flow line for longitudinal movement on said structure while supporting a second length of said flow line at least at its free end,
   connecting to the free end of said first length a sufficient length of pipe to extend the length of said first length such that the extended length is sufficient to reach from above water surface to water bottom,
   lowering said extended first length to water bottom while continuing to support said second length, and
   then connecting the extended first length to said well structure.

5. A method in accordance with claim 4 in which the second length is supported from the water surface.

6. A method in accordance with claim 5 in which the second length is supported by a floating vehicle.

7. A method for connecting a well structure extending from above water surface to water bottom to a curved flow line, a first length of said flow line being relatively short as compared to a second length of said flow line, which comprises arranging the first length of said flow line for longitudinal movement on said structure while supporting the second length of said flow line at least at its free end, connecting to the free end of said first length a sufficient length of pipe to extend the length of said first such that the extended length is sufficient to reach from above water surface to water bottom, lowering said extended first length to water bottom while conitnuing to support said second length, and then connecting the extended first length to said well structure.

8. A method for connecting a well structure extending from above water surface to water bottom to a curved flow line, a first length of said flow line being relatively short as compared to a second length of said flow line, which comprises arranging the first length of said flow line for longitudinal movement on said structure while supporting the second length of said flow line at least at its free end from the water surface, connecting to the free end of said first length a sufficient length of pipe to extend the length of said first length such that the extended length is sufficient to reach from above water surface to water bottom, lowering said extended first length to water bottom while continuing to support said second length, and then connecting the extended first length to said well structure.

9. A method for connecting a well strucutre extending from above water surface to water bottom to a curved flow line, a first length of said flow line being relatively short as compared to a second length of said flow line, which comprises arranging the first length of said flow line for longitudinal movement on said structure while supporting the second length on said flow line at least at its free end, connecting to the free end of said first length a sufficient number of lengths of pipe to extend the length of said first length such that the extended length is sufficient to reach from above water surface to water bottom, lowering said extended first length as each length of pipe is added until water bottom is reached while continuing to support said second length, and then connecting the extended first length to said well structure.

10. A method for connecting a well structure extending from above water surface to water bottom to a curved flow line, a first length of said flow line being relatively short as compared to a second length of said flow line, which comprises arranging the first length of said flow line for longitudinal movement on said structure while supporting the second length of said flow line at least at its free end from the water surface, connecting to the free end of said first length a sufficient number of lengths of pipe to extend the length of said first length such that the extended length is sufficient to reach from above water surface to water bottom, lowering said extended first length as each length of pipe is added until water bottom is reached while continuing to support said second length, and then connecting the extended first length to said well structure.

11. A method for placing a curved flow line on a well structure extending from above water surface to water bottom, a first length of said flow line being relatively short as compared to a second length of said flow line, which comprises arranging the first length of said flow line for longitudinal movement on said structure while supporting the second length of said flow line at least at its free end, connecting to the free end of said first length a sufficient length of pipe extend the length of said first length such that the extended length is sufficient to reach from above water surface to water bottom, lowering said extended first length to water bottom while continuing to support said second length, connecting to the free end of the second length a sufficient length of pipe to extend the length of the second length to a selected point, and connecting the extended first length to said well structure.

12. A method for connecting a well structure extending from above water surface to water bottom to a curved flow line, a first length of said flow line being relatively short as compared to a second length of said flow line, which comprises arranging the first length of said flow line for longitudinal movement on said structure while supporting the second length of said flow line at least at its free end, connecting to the free end of said first length a sufficient length of pipe to extend the length of said first length such that the extended length is sufficient to reach from above water surface to water bottom, lowering said extended first length to water bottom while continuing to support said second length, connecting the extended first length to said well structure, and connecting the free end of said second length with a sufficient length of pipe sufficient to extend the length of the second length to a selected point.

13. A method for placing a flow line on a well structure extending from above water surface to water bottom, which comprises arranging a first length of said flow line for longitudinal movement on said structure, connecting to the free end of said first length a sufficient length of pipe to extend the length of said first length such that the extended length is sufficient to reach from above water surface to water bottom, lowering said extended first length to water bottom, and then connecting the extended first length to said well structure.

14. A method in accordance with claim 13 in which the flow line is curved.

15. A method for connecting a pipe line to an offshore well structure including a well extending to a submarine formation in a body of water which comprises arranging a conduit on said structure having an end connected to said pipe line and a free end, moving said conduit from a first position to a second position on said structure while extending the length of said free end until said conduit extends from a point at least adjacent water bottom to a point at least adjacent water surface, and then connecting said extended conduit to said well structure.

16. A method in accordance with claim 15 in which the first length of said flow line is relatively short and extends in one direction as compared to a second length of said flow line which extends in another direction.

17. A method of placing a tubular structure on an offshore structure in a body of water comprising:

supporting a substantially horizontal section of the tubular structure in said body of water as a substantially vertical section coupled to said horizontal section is disposed on said offshore structure; and adding lengths of tubular structure to said vertical section as said vertical section is lowered on said offshore structure until said horizontal section rests on the bottom of the body of water.

References Cited
UNITED STATES PATENTS

| | | | |
|---|---|---|---|
| 1,220,189 | 3/1917 | Chapman | 61—72.3 |
| 1,363,115 | 12/1920 | Helfrich | 61—72.3 X |
| 1,647,448 | 11/1927 | Jones | 61—72.4 X |
| 2,447,937 | 8/1948 | Ellis et al. | 61—72.4 X |
| 2,731,800 | 1/1956 | Collins | 61—72.4 |

CHARLES E. O'CONNELL, Priamry Examiner

I. A. CALVERT, Assistant Examiner

U.S. Cl. X.R.

166—.5